United States Patent

Chigasaki

[11] Patent Number: 5,260,922
[45] Date of Patent: Nov. 9, 1993

[54] DISK MAGAZINE REMOVER SYSTEM

[75] Inventor: Hiroyuki Chigasaki, Tokyo, Japan
[73] Assignee: Sony Corporation, Tokyo, Japan
[21] Appl. No.: 804,054
[22] Filed: Dec. 9, 1991

[30] Foreign Application Priority Data

Dec. 20, 1990 [JP] Japan .................. 2-404093

[51] Int. Cl.⁵ .......................... G11B 17/22
[52] U.S. Cl. ....................... 369/36; 360/99.06
[58] Field of Search ............ 369/36, 77.2, 178, 191, 369/192, 193, 291; 360/99.02, 99.06, 98.01, 98.04, 98.06, 96.5

[56] References Cited

U.S. PATENT DOCUMENTS

| | | | |
|---|---|---|---|
| 4,685,010 | 8/1987 | Tronzano | 360/99.06 |
| 4,737,945 | 4/1988 | Yamazaki et al. | 369/36 |
| 4,864,551 | 9/1989 | Tomita et al. | 369/36 |
| 4,949,324 | 8/1990 | Arata | 369/36 |
| 5,014,258 | 5/1991 | Takemasa et al. | 369/36 |
| 5,021,904 | 6/1991 | Shimizu et al. | 360/96.5 |
| 5,025,339 | 6/1991 | Kanno et al. | 360/99.06 |

FOREIGN PATENT DOCUMENTS 62-90453 6/1987 Japan .

OTHER PUBLICATIONS

Patent Abstracts of Japan, vol. 13, No. 422, Published Sep. 20, 1989 corres. to Japanese Applications 1-154361, 1-54360 (Seizo).
Patent Abstracts of Japan, vol. 14, No. 293, Published Jun. 25, 1990, corres. to Japanese Application 2-089250 (Suzuki).

Primary Examiner—Stuart S. Levy
Assistant Examiner—Paul J. Ditmyer
Attorney, Agent, or Firm—Lewis H. Eslinger; Jay H. Maioli

[57] ABSTRACT

A disk magazine remover system includes an ejector lever (7) rotatably supported to a chassis (3), a first elastic member (8) arranged between the chassis (3) and the ejector lever (7) for biasing the ejector lever (7) in a magazine ejecting direction, a limiter (13) rotatably supported to the chassis (3), a second elastic member (14) arranged between the ejector lever (7) and the limiter (13) for biasing the ejector lever (7) in the magazine ejecting direction, and a lock releasing mechanism (20) for releasing the magazine locked by a lock lever (6) and including a motor (21) and a cam gear (27) rotated thereby.

7 Claims, 10 Drawing Sheets

DISK MAGAZINE REMOVER SYSTEM

BACKGROUND OF THE INVENTION

The present invention relates to a disk magazine remover system for use, e.g., in a changer type compact disk (referred hereinafter as "CD") player which can play a plurality of CDs consecutively.

There is known a changer type CD player having a magazine which can receive, for example, 10 CDs, in which a CD is selectively withdrawn from the magazine and loaded on an optical pickup for replay, and it is received in the magazine again after replay.

Figure 9:
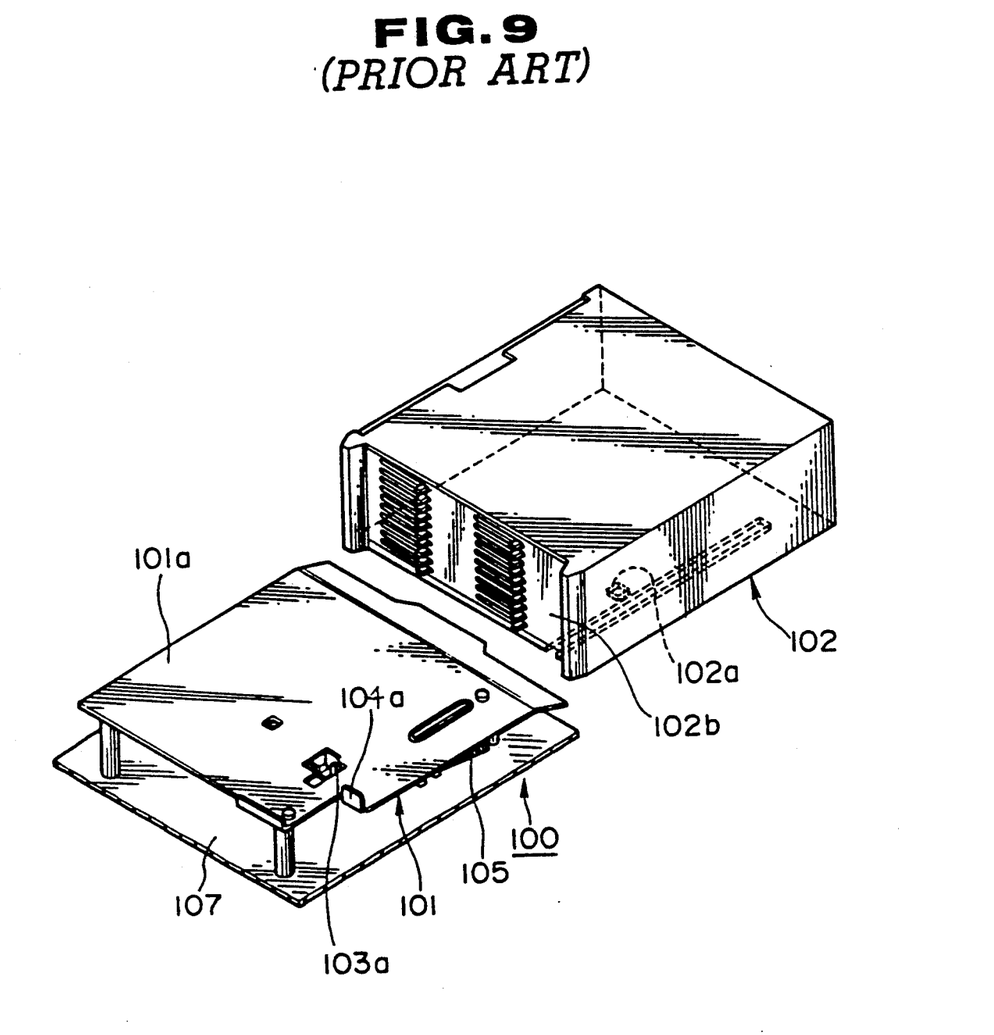
FIG. 9 is a view similar to FIG. 8, showing a known disk magazine remover system.
Figure 10:
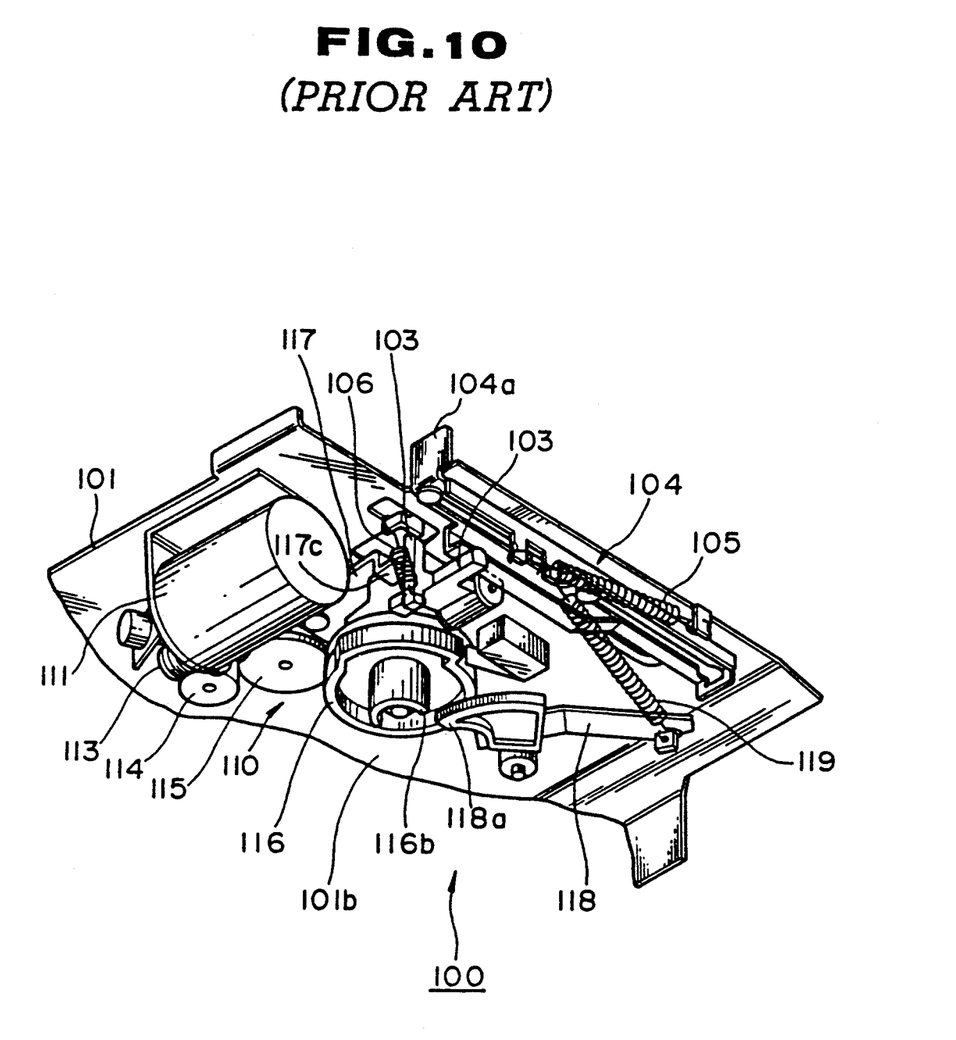
FIG. 10 is a view similar to FIG. 9, showing a lower side of a chassis of the known disk magazine remover system.
Figure 11:
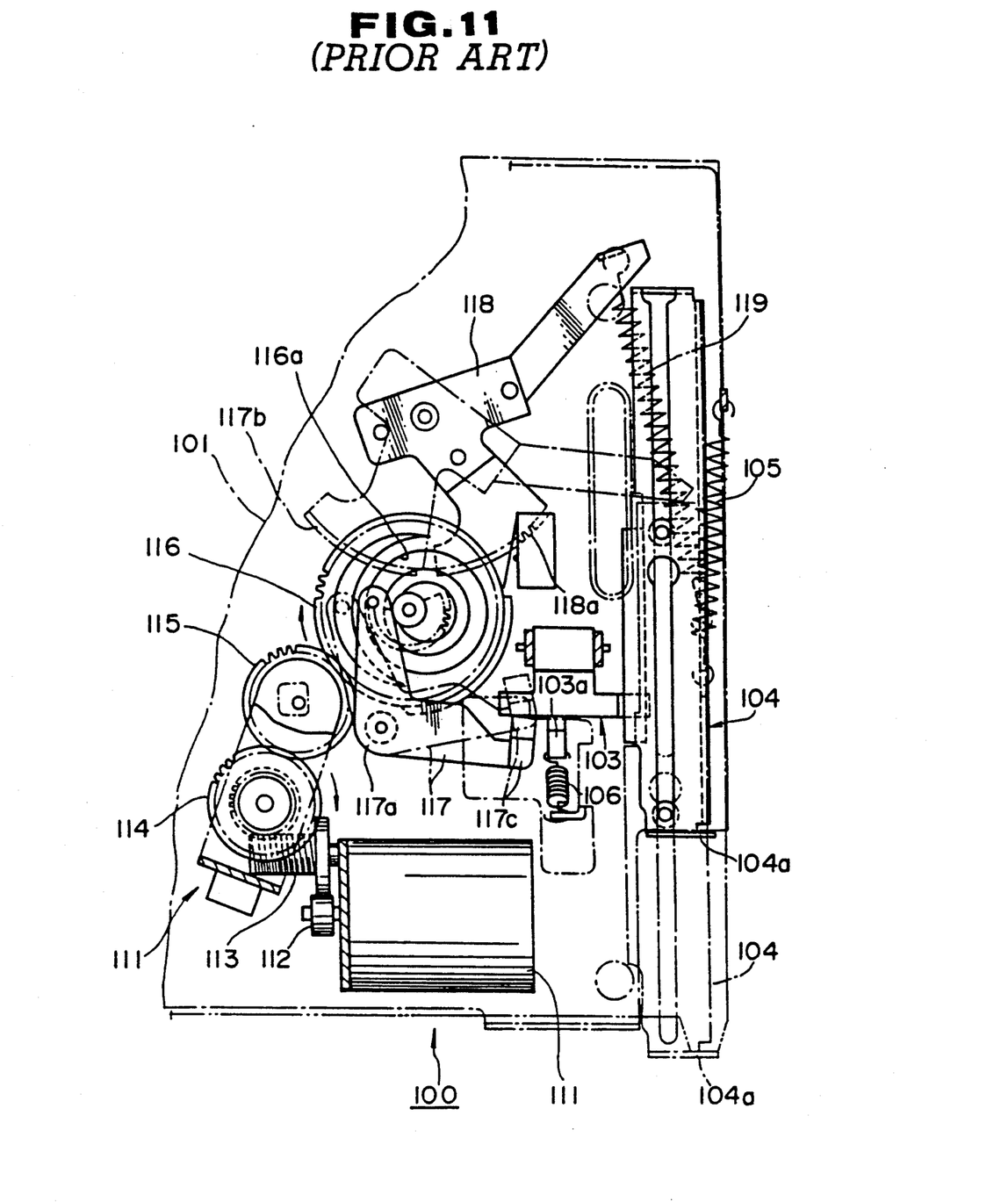
FIG. 11 is a plan view, showing the lower side of the chassis of the known disk magazine remover system.

This CD player includes a disk magazine remover system which is disclosed, for example, in JP-U 62-90453. Referring to FIGS. 9 to 11, this disk magazine remover system designated by a reference numeral 100 includes a chassis 101 on which a magazine 102 with CDs (not shown) is slidably set, a lock lever 103 for locking the magazine 102 set on the chassis 101 through a click 103a which is protrudably arranged on the chassis 101 to engage with a recess 102a of the magazine 102, a slide ejector lever 104 slidably mounted to the chassis 101 on its lower side 101b and having an engagement portion 104a which protrudes from the chassis 101 to press a back 102b of the magazine 102 at its one end (left end as viewed from the front of the magazine 102) so as to eject the magazine 102. An extension coil spring 105 as an elastic member is arranged between the ejector lever 104 and the chassis 101 for biasing the ejector lever 104 in such a direction as to eject the magazine 102 (referred hereinafter as "magazine ejecting direction"), and a lock releasing mechanism 110 for releasing a lock on the magazine 102 by the lock lever 104.

The lock releasing mechanism 110 includes generally a motor 111 fixedly mounted on the lower side 101b of the chassis 101 and having a rotation shaft with a gear 112, a cam gear 116 having a cam groove 116a which receives torque from the gear 112 of the motor 111 through a worm gear 113 and a pair of intermediate gears 114, 115, and a lock releasing lever 117 having a base 117a pinned to the chassis 101, and one end 117b engaged with the groove 116a and the other end 117c to be in contact with the lock lever 103 so that the click 103a of the lock lever 103 protrude from the chassis 101. The cam gear 116 has a small gear portion 116b engaged with a large gear portion 118a which is integrally formed with a swing lever 118 at its one end, which is pinned to the lower side 101b of the chassis 101. Arranged between the other end of the swing lever 118 and the ejector lever 104 is an extension coil spring 119 as an elastic member for biasing the ejector lever 104 in the magazine ejecting direction. It is to be noted that in FIGS. 10 and 11, a reference numeral 106 designates an extension coil spring for biasing the lock lever 103 in such a direction as to cause the click 103a to protrude from the chassis 101, and that in FIG. 9, a reference numeral 107 designates a main chassis on which the chassis 101 is mounted.

When setting the magazine 102 with the CDs (not shown) on the chassis 102, the engagement portion 104a of the ejector lever 104 is pressed by the back 102b of the magazine 102 against the biasing force of the extension coil spring 105 so as to slide the magazine 102 on the chassis 101. Referring to FIG. 11, when the magazine 102 reaches its setting position on the chassis 101 as indicated by a two-dotted chain line in FIG. 11, the click 103a of the lock lever 103 protrudes from the chassis 101 so as to engage with the recess 102a of the magazine 102, thus locking the magazine 102.

On the other hand, when ejecting the magazine 102 from the chassis 101, the motor 111 of the lock releasing mechanism 110 is driven. Drive of the motor 111 produces rotation of the cam gear 116, actuating the lock releasing lever 117 which is engaged with the cam groove 116a of the cam gear 116. The click 103a of the lock lever 103 is thus retracted to the lower side 101a of the chassis 101, releasing the lock on the magazine 102. The engagement portion 104a of the ejector lever 104 presses the back 102b of the magazine 102 on its one end by the biasing force of the extension coil spring 105, thus ejecting the magazine 102.

With the previously known disk magazine remover system 100, however, since the ejector lever 104 for ejecting the magazine 102 is urged to slide on the lower side 101b of the chassis 101, slide friction produced between the ejector lever 104 and the lower side 101b of the chassis 101 results in a loss of magazine ejecting force due to the ejector lever 104. When the magazine 102 is loaded with 10 CDs in particular, a smooth ejection thereof cannot be obtained by the biasing force of the extension coil spring 105 or the like. Further, since the extension coil spring 119 should be arranged on the side of the lock releasing mechanism 110 so as to assist the biasing force of the extension coil spring 105, and the swing lever 118 is needed in addition to the cam gear 116 to move the extension coil spring 119, component parts of the lock releasing mechanism 110 increase in number, resulting in a complicated arrangement thereof.

It is, therefore, an object of the present invention to provide a disk magazine remover system which is simple in architecture, and can smoothly and surely eject a heavy magazine.

SUMMARY OF THE INVENTION

There is provided, according to the present invention, a disk magazine remover system having a magazine, the magazine having a recess on a bottom thereof, including:
a chassis on which the magazine is slidably set;
a lock lever arranged for locking the magazine set on the chassis, the lock lever having a click which is engaged with the recess of the magazine;
an ejector lever rotatably supported to the chassis, the ejector lever including an engagement portion which protrudes from the chassis to press the magazine;
a first elastic member arranged between the chassis and the ejector lever for biasing the ejector lever in a direction such as to eject the magazine;
a limiter rotatably supported to the chassis;
a second elastic member arranged between the ejector lever and the limiter for biasing the ejector lever in the ejection direction such as to eject the magazine; and
a lock releasing mechanism arranged for releasing the magazine locked by the lock lever.

DETAILED DESCRIPTION OF THE INVENTION

Referring to the drawings, a preferred embodiment of the present invention will be described. Referring to FIGS. 1 to 5, a reference numeral 1 designates a disk magazine remover system which is mounted, for example, on a main chassis 3 of a changer type compact disk (referred hereinafter as "CD") player 2 for an automotive vehicle. This disk magazine remover system 1 includes a chassis 5 on which a magazine 50 which can receive 10 CDs 51 is slidably set, a lock lever 6 for locking the magazine 50 set on the chassis 5 through a click 6a which protrudes from the chassis 5 to engage with a recess 50b formed on a bottom 50a of the magazine 50, an ejector lever 7 movably mounted to the chassis 5 on its lower side 5b and having a columnar engagement portion 7a which protrudes from the chassis 5 to press a back 50c of the magazine 102 substantially in its center portion so as to eject the magazine 50, a torsion coil spring (first elastic member) 8 arranged between the ejector lever 7 and the chassis 5 for biasing the ejector lever 7 in such a direction as to eject the magazine 50 (referred hereinafter as "magazine ejecting direction"), and a lock releasing mechanism 110 for releasing a lock state of the magazine 50 by the lock lever 6.

Arranged in the four corners of the main chassis 3 are upward lugs 3a to 3d bent upwardly vertically and thus shaped in an inverted L. A substantially rectangular printed board 4 is fixedly mounted, by predetermined means, to the main chassis 3 on its lower side so as to locate leftwardly outwardly of the chassis 3. The chassis 5 is fixedly mounted to the upward lugs 3a to 3d of the main chassis 3 by bolts and the like (not shown). The chassis 5 is made of a metal plate and shaped substantially in a rectangle, and has a rectangular hole 5c to correspond to the click 6a of the lock lever 6. Additionally, the chassis 5 has, from the center of its rear edge to its center portion, a substantially arched groove 5d along which the engagement portion 7a of the ejector lever 7 passes. Fixedly mounted to the chassis 5 on its left upper side 5a by bolts and the like is a guide rail 9 made of a synthetic resin for guiding a groove 50d formed in the base 50a of the magazine 50.

The lock lever 6 is made of a synthetic resin, and has a base 6b vertically rotatably supported by a pin 10 to the upward lug 3e which is positioned substantially in the center of a left edge of the chassis 3. Additionally, the lock lever 6 is always biased upwardly by a compression coil spring 11 arranged between a tongue 3f of the main chassis 3 and a lower side of the lock lever 6. Thus, the click 6a of the lock lever 6 protrudes from the upper side 5a of the chassis 5 through the rectangular hole 5c of of the chassis 5 through the rectangular hole 5c of the chassis 5, engaging with the engagement portion 50b of the magazine 50. A columnar cam follower 6c is protuberantly integrally formed with the lock lever 6 on its side facing the chassis 5.

The ejector lever 7 is made of a metal plate and shaped substantially in a diamond, and has a head to which the columnar engagement portion 7a is secured to protrude from the chassis 5. Additionally, the ejector lever 7 has a center portion 7b rotatably supported to a supporting shaft 12 which is protuberantly arranged on the lower side 5b of the chassis 5. The torsion coil spring 8 has ends 8a, 8c held to a base 7c of the ejector lever 7 bent downwardly, and a downward lug 5e of the chassis 5 bent to its lower side 5b, respectively. Additionally, the torsion coil spring 8 has a coil 8b arranged on the supporting shaft 12, and provides force so that the columnar engagement portion 7a of the ejector lever 7 is always baised in the groove 5d of the chassis 5 toward the magazine ejecting direction. There is a small clearance between the bottom of the ejector lever 7 and the lower side 5b of the chassis 5 so as to prevent the ejector lever 7 from coming in slide contact with the lower side 5b of the chassis 5 when the ejector lever 7 rotates.

A limiter 13 is arranged between the ejector lever 7 and the torsion coil spring 8, and has a center portion rotatably supported to the supporting shaft 12. The limiter 13 is made of a metal plate and shaped substantially in sectors, and has an upward lug 13a which is located at its head and bent upwardly and to which the base 7c of the ejector lever 7 is held. For biasing the ejector lever 7 in the magazine ejecting direction, an extension coil spring (second elastic member) 14 is arranged between the base 7c of the ejector lever 7 and a tongue 13b extending from a left upper end of the limiter 13 as viewed in FIG. 2. Additionally, the limiter 13 is formed with a columnar cam follower 13c protuberantly arranged on its lower side to the right as viewed in FIG. 2.

Figure 2:
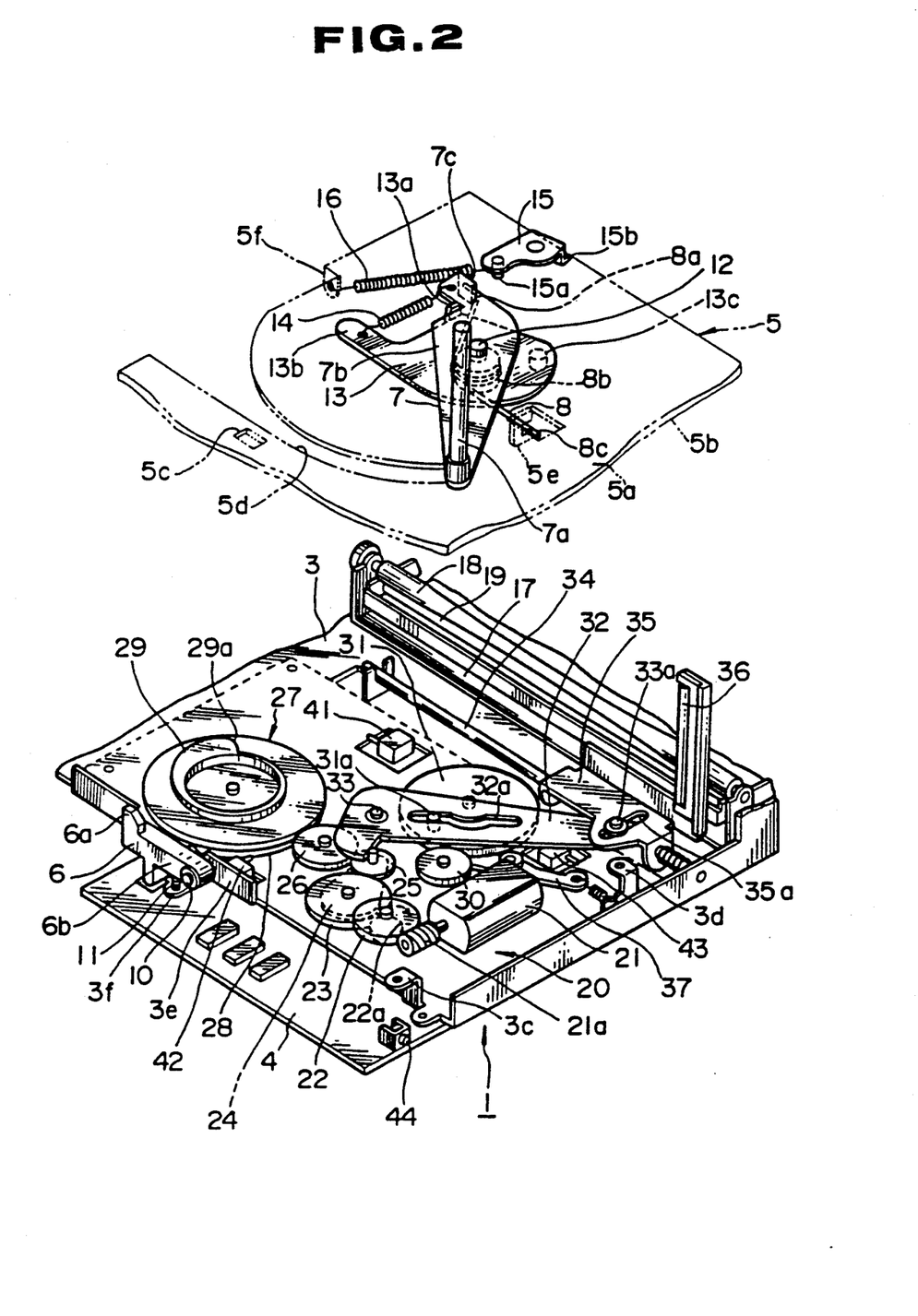
FIG. 2 is a perspective exploded view showing the disk magazine remover system.
Figure 3:
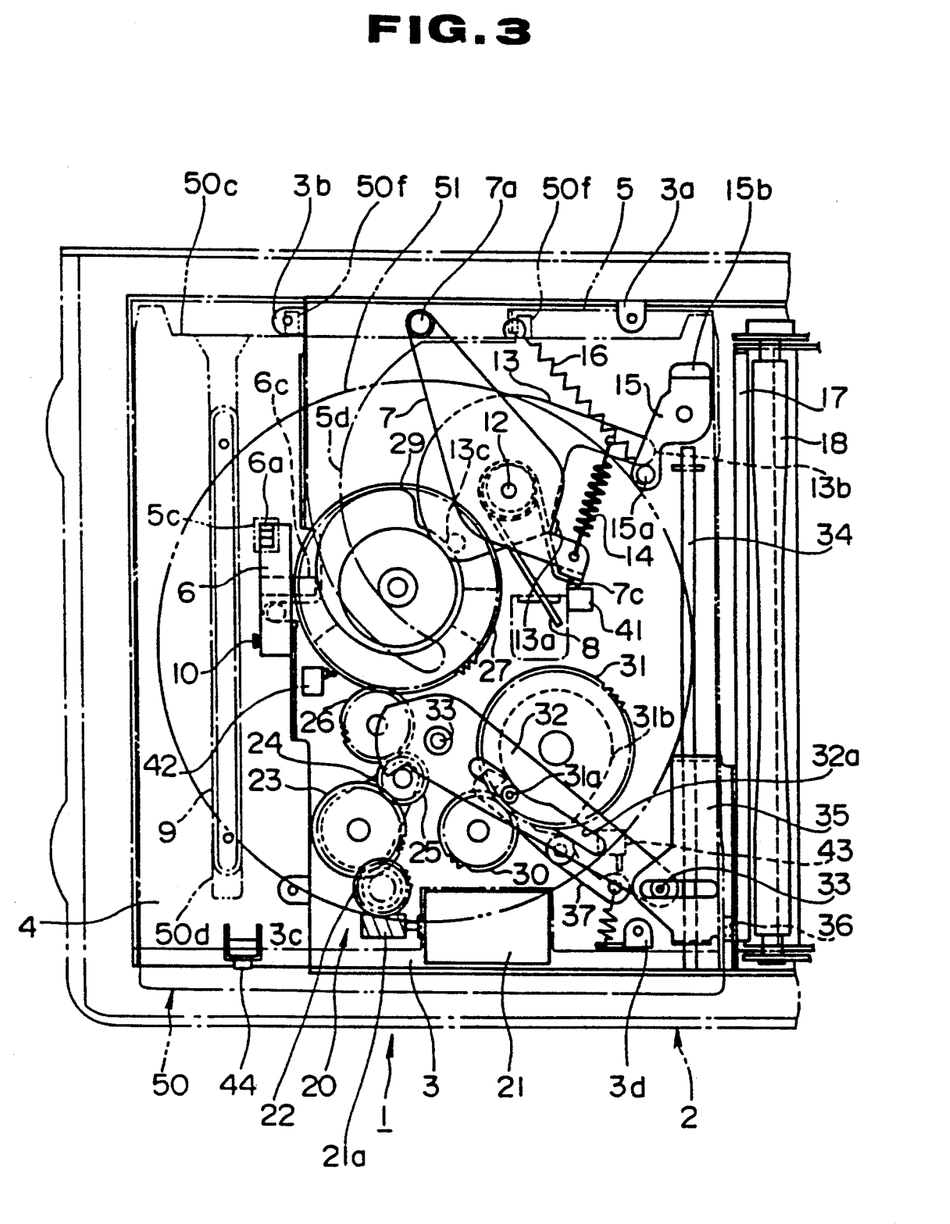
FIG. 3 is a plan view showing the disk magazine remover system when receiving a magazine.
Figure 4:
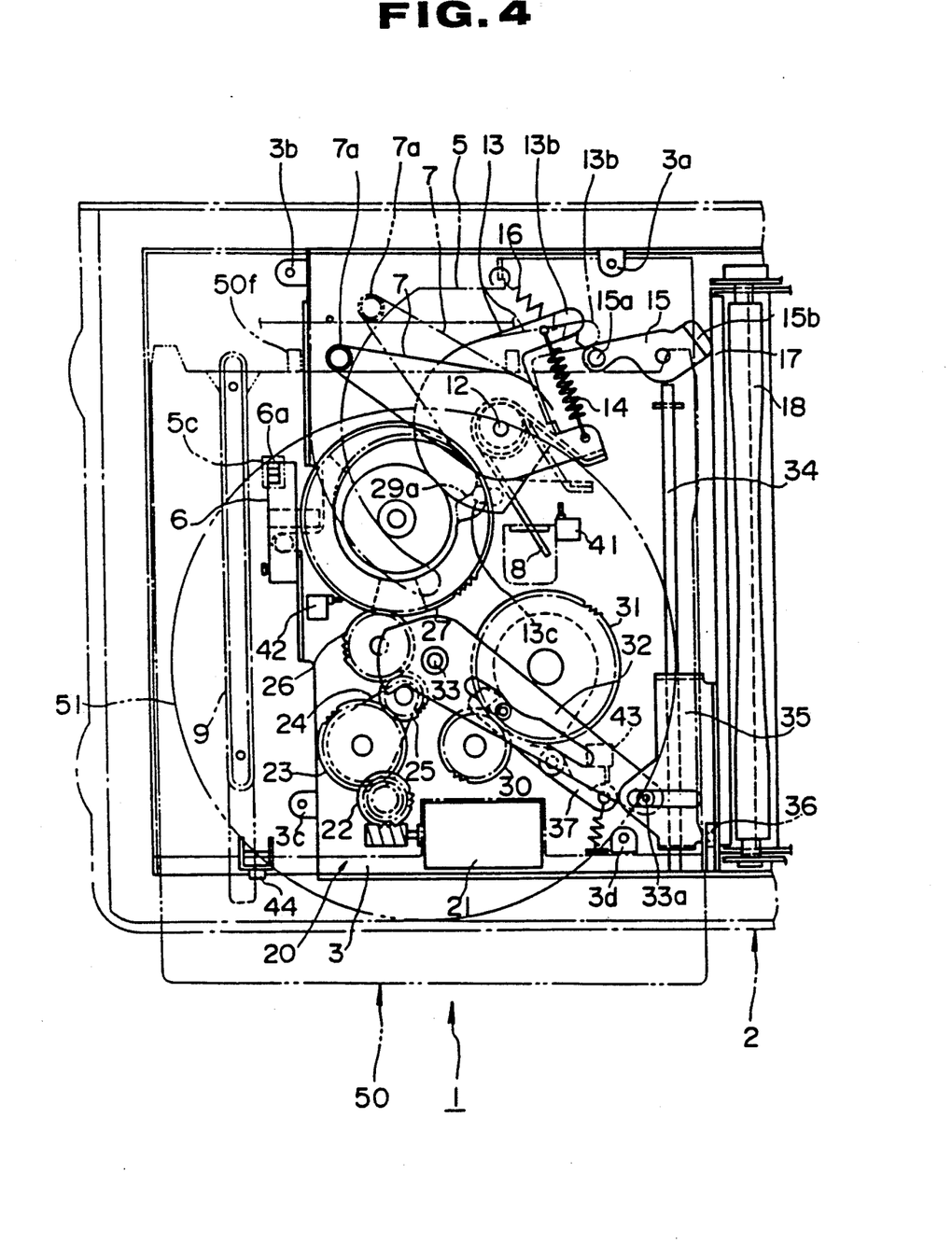
FIG. 4 is a view similar to FIG. 3, showing the disk magazine remover system when ejecting the magazine.
Figure 5:
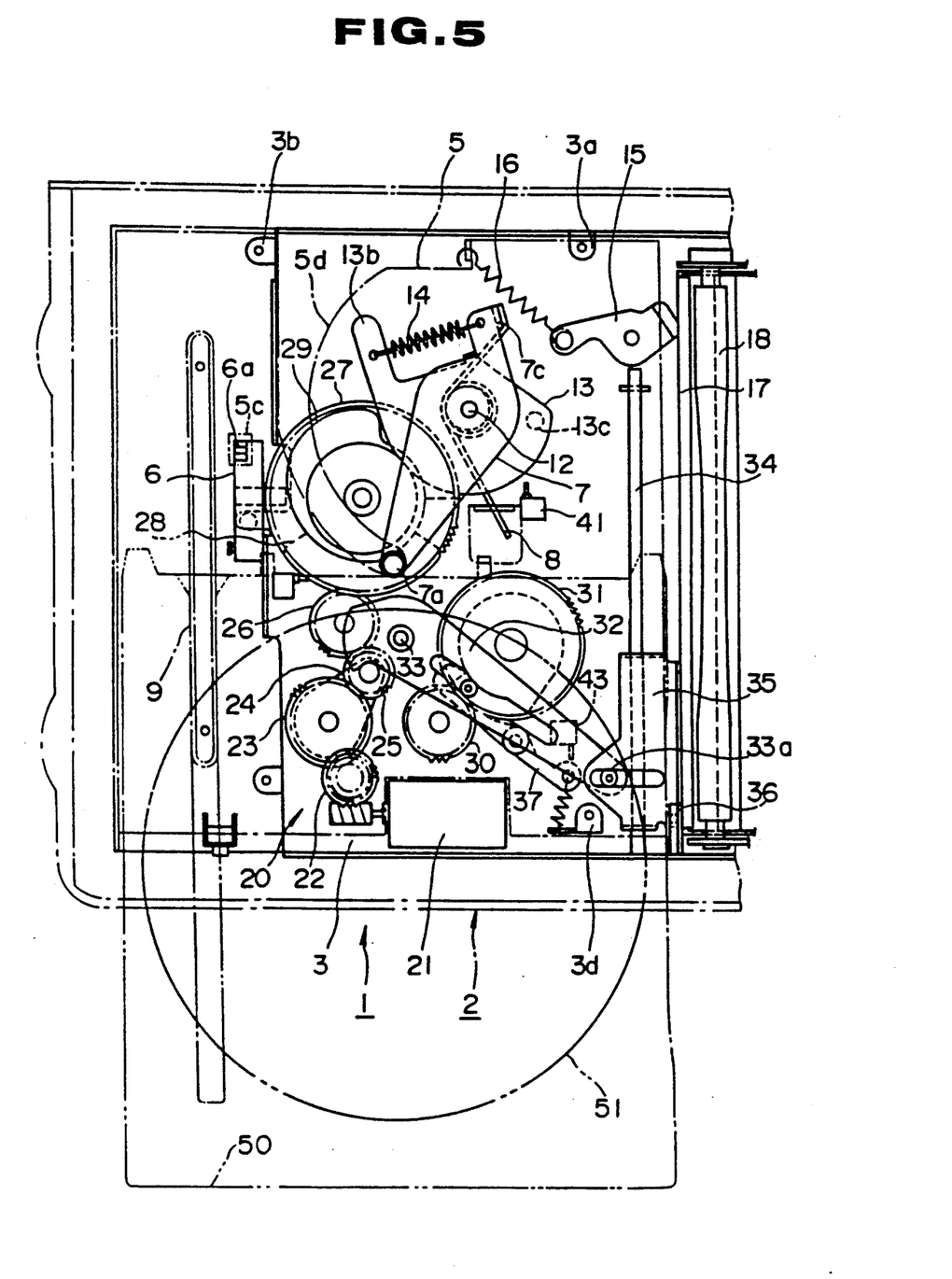
FIG. 5 is a view similar to FIG. 4, showing the disk magazine remover system upon completion of ejection of the magazine.

A lever 15 is pinned on the lower side 5b of the chassis 5 at the rear of its right edge as viewed in FIG. 2. An extension coil spring 16 is arranged between a pin portion 15a protuberantly disposed on a base of the lever 15 and a downward lug 5f of the chassis 5 bent downwardly and located at its rear edge as viewed in FIG. 2. Referring to FIGS. 4 and 5, a head 15b of the lever 15 protrudes from a right edge of the chassis 5 as viewed in FIGS. 4 and 5, thus controlling upward motion of an up-and-down plate 17 of the CD player 2. Referring to FIG. 3, when the engagement portion 7a of the ejector lever 7 is pressed by the back 50c of the magazine 50 so as to rotate the ejector lever 7 and the limiter 13 counterclockwise as viewed in FIG. 3, the tongue 13b of the limiter 13 comes in contact with the pin portion 15a of the lever 15, thus releasing the control of upward motion of the up-and-down plate 17 by counterclockwise rotation of the lever 15 as viewed in FIG. 3 against tension of the extension coil spring 16.

The lock releasing mechanism 20 includes a motor 21 fixedly mounted on the main chassis 3, an intermediate gear 22 engaged with a worm gear 21a of the motor 21 and pinned to the main chassis 3, a drive gear 23 engaged with a lower small gear portion 22a of the intermediate gear 22 and pinned to the main chassis 3, a swing gear 25 pinned to a metal swing plate 24 at its head which is pinned to the main chassis 3 with the drive gear 23 and engaged therewith, an intermediate gear 26 engaged with the swing gear 25 when the swing plate 24 is urged to to the main chassis 3, and a cam gear 27 engaged with the intermediate gear 26 and pinned to the main chassis 3. These gears 21a to 27 are made of a synthetic resin, respectively.

Figure 6:
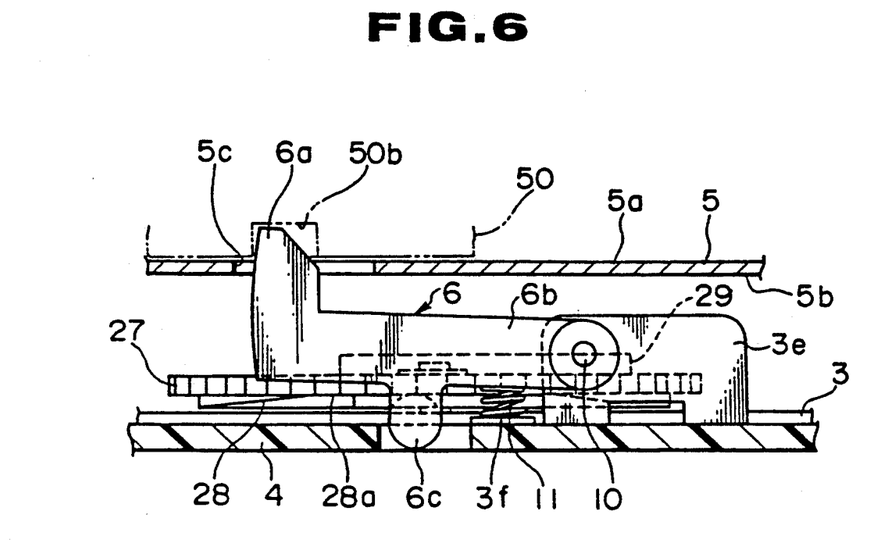
FIG. 6 is an enlarged sectional view showing a magazine lock state of the disk magazine remover system.
Figure 7:
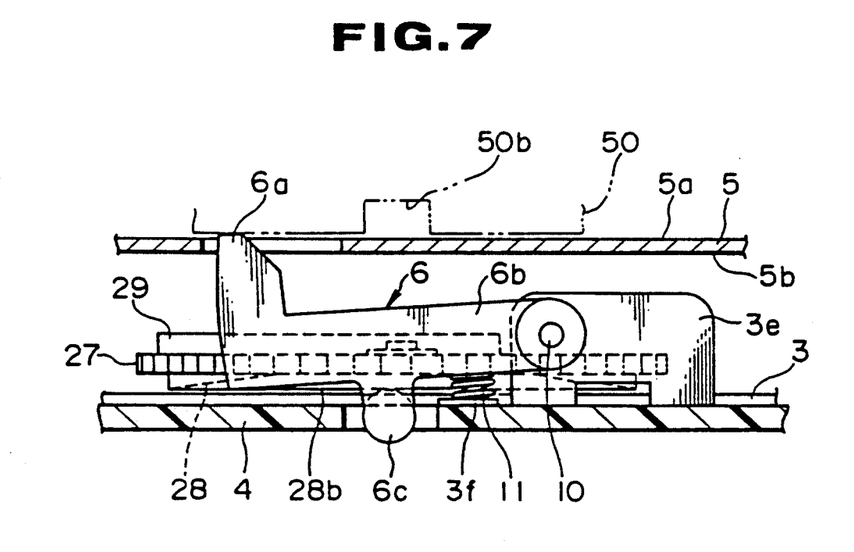
FIG. 7 is a view similar to FIG. 6, showing a magazine lock releasing state of the disk magazine remover system.

A first cam portion 28 for protruding the click 6a of the lock lever 6 from the chassis 5 is integrally formed with the cam gear 27 on its lower side, whereas a second cam portion 29 for rotating the limiter 13 in the magazine ejecting direction is integrally formed with the cam gear 27 on its upper side. Referring to FIGS. 6 and 7, the first cam portion 28 has a high cam surface 28a and a low cam surface 28b which are different in height. As shown in FIG. 6, when the cam follower 6c of the lock lever 6 comes in slide contact with the high cam surface 28a, the click 6a of the lock lever 6 protrudes from the chassis 5 through the hole 5c of the chassis 5. On the other hand, as shown in FIG. 7, when the cam follower 6c of the lock lever 6 comes in slide contact with the low cam surface 28b, the click 5a of the lock lever 6 retracts in the hole 5c of the chassis 5. The second cam portion 29 is shaped substantially in a heart cam, and has a protrusion 29a. When coming in contact with the protrusion 29a, the cam follower 13c of the limiter 13 is pressed counterclockwise as viewed in FIG. 4, rotating the limiter 13 in the same direction. This assists biasing force of the torsion coil spring 8 through tension of the extension coil spring 14, thus reinforcing the magazine ejecting force of the engagement portion 7a of the ejector lever 7.

Pinned to the main chassis 3 on the side of the motor 21 is an intermediate gear 30 which engages with the swing gear 25 when the swing plate 24 is urged to swing clockwise as viewed in FIG. 4. A cam gear 31 as pinned to the main chassis 3 is engaged with the intermediate gear 30. A pin-shaped cam portion 31a is protuberantly arranged to the cam gear 31 on its upper side. The cam portion 31a of a cam follower which is formed as a substantially L-shaped lever 32 substantially in its center portion. The lever 32 has one end rotatably supported to the main chassis 3 through the supporting shaft 33, and the other end has a pin portion 33a protuberantly arranged extending therefrom. The pin portion 33a is insertedly arranged in a long groove 35a of a slider 35. For reciprocating motion, the slider 35 is penetrated by a guide bar 34 disposed on the main chassis 3 in parallel with a pair of guide rollers 18, 19 of the up-and-down plate 17. With reciprocation of the slider 35 due to rotation of the lever 32, a guide pole 36 as disposed on the slider 35 at its one end is reciprocated along the pair of guide rollers 18, 19, thus securely receiving in the magazine 50 the CD 51 which is carried thereto by the pair of guide rollers 18, 19.

First, second, and third switches 41 to 43 are arranged on the printed board 4 in the positions corresponding to the base 7c of the ejector lever 7, and the cam gears 27, 31, and they protrude from the chassis 3. The first switch 41 serves to check the presence of the magazine 50, and it is turned on by the base 7c of the ejector lever 7 when the magazine 50 is set on the chassis 5. The second switch 42 serves to determine a stop position of the cam gear 27, and it is normally turned on and turned off with rotation of the cam gear 27, and turned on again to stop the cam gear 27. The third switch 43 serves to determine a position of the slider 36 for pressing the CD 51 into the magazine 50, and it is turned on and off by a stopper 37 actuated by a lower cam surface 31b of the cam gear 31. When the switch 43 is ON, the slider 35 is located to prevent the CD 51 from going out of the magazine 50, whereas when the switch 43 is OFF, the slider 35 is located so that the CD 51 is accessible to the magazine 50.

Figure 1:
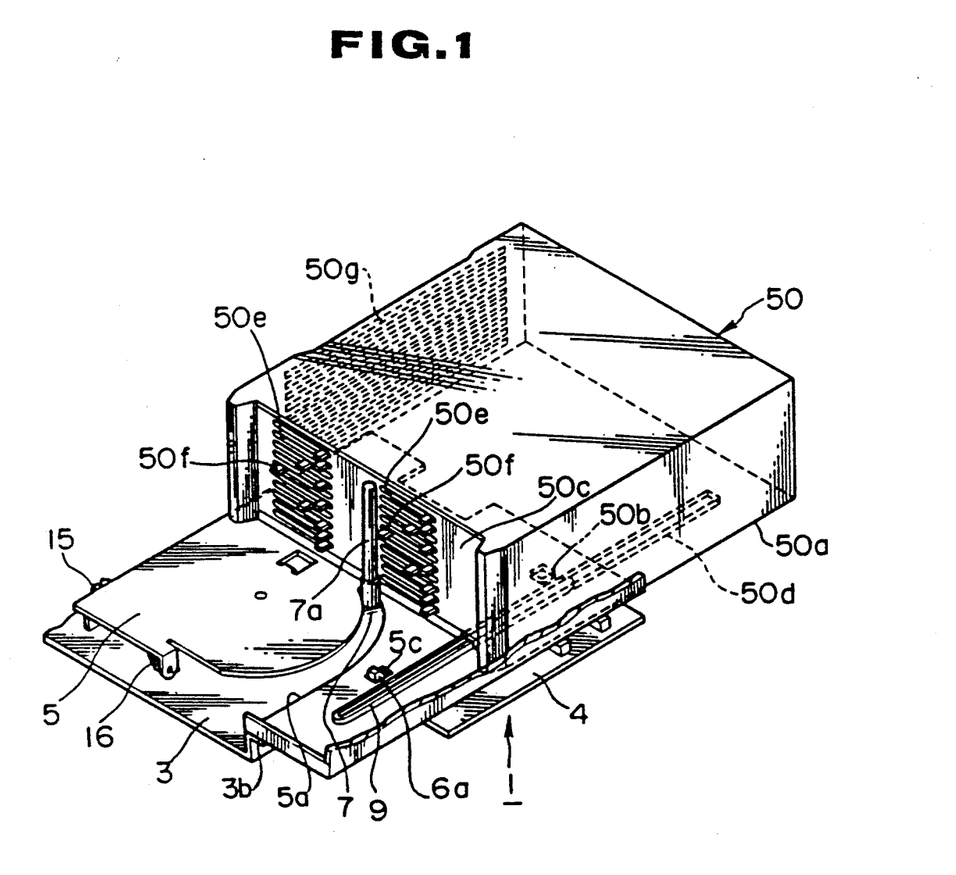
FIG. 1 is a perspective view showing a preferred embodiment of a disk magazine remover system according to the present invention.

It is to be noted that a reference numeral 44 designates an ejector switch protuberantly arranged on the printed board 4 on its front portion for ejecting the magazine 50. As shown in FIG. 1, the back 50c of the magazine 50 has 10 slits 50e on its right and left, respectively. Engaged with each slit 50e is a protrusion 50f protruding from a slider (not shown) which is movably disposed for selectively taking out the 10 CDs 51 stacked in the magazine 50. Additionally, the magazine 50 has on its right side 10 openings 50g for receiving and ejecting each CD 51.

With this embodiment of the disk magazine remover system 1, when setting the magazine 50 with the CDs 51 on the chassis 5 for magazine setting of the CD player 2, the columnar engagement portion 7a of the swing arm type ejector lever 7 is pressed by the back 50c of the magazine 50 against the biasing force of the torsion coil spring 8 so as to slide the magazine 50 on the chassis 5 along the guide rail 9 as shown in FIG. 1. During this setting operation, the engagement portion 7a of the ejector lever 7 initially is in contact with the center of the back 50c of the magazine 50 and is urged to the left portion of the chassis 3 by sliding on the back 50c from the center to the side of the lock lever 6, thus moving the 10 protrusions 50f for withdrawing the CD 51 to the left of the slits 50e, resetting the protrusions 50f. When the magazine 50 reaches a setting position on the chassis 5 as shown in FIG. 3, the click 6a of the lock lever 6 protrudes from the chassis 3 through the hole 5c by the biasing force of the compression coil spring 11, and engages with the recess 50b of the magazine 50 as shown in FIG. 6, thus locking the magazine 50.

On the other hand, when ejecting the magazine 50 from the chassis 5, the ejector switch 44 is turned on. This actuates the motor 21 of the lock releasing mechanism 20 in the normal direction to rotate the intermediate gear 22 in a direction as indicated by an arrow in FIG. 2 or clockwise. The drive gear 23 as engaged with the lower small gear portion 22a of the intermediate gear 22 is rotated counterclockwise to swing the swing plate 24 counterclockwise, engaging the swing gear 25 with the intermediate gear 26. The cam gear 27 as engaged with the intermediate gear 26 is then rotated counterclockwise so that the low cam surface 28b of the first cam portion 28 of the cam gear 27 directly moves the cam follower 6c of the lock lever 6 downwardly against biasing force of the compression coil spring 11. As a result, the click 6a of the lock lever 6 is retracted in the hole 5c of the chassis 5, releasing the lock on the magazine 50. Thus, as shown in FIG. 5, the engagement portion 7a of the ejector lever 7 presses the back 50c of the magazine 50 with biasing force of the torsion coil spring 8 so as to eject the magazine 50 along the guide rail 9 of the chassis 5.

When receiving 10 CDs 51, the magazine 50 increases relatively in weight. In this case, the protrusion 29a of the second cam portion 29 of the cam gear 27 is rotated with normal rotation of the motor 21 so as to directly press the cam follower 13c of the limiter 13, thus rotating the limiter 13 in the magazine ejecting direction as indicated by a two-dotted chain line in FIG. 4. The limiter 13 draws the ejector lever 7 through the extension coil spring 14 in the magazine ejecting direction as indicated by a fully drawn line in FIG. 4, reinforcing the magazine ejecting force of the engagement portion 7a of the ejector lever 7, thus permitting smooth ejecting of the heavy magazine 50.

In such a manner, the ejector lever 7 for ejecting the magazine 50 and the limiter 13 for reinforcing the magazine ejecting force of the ejector lever 7 are both rotatably coaxially supported to the supporting shaft 12 which is protuberantly arranged on the lower side 5b of the chassis 5. The torsion coil spring 8 is arranged between the base 7c of the ejector lever 7 and the downward lug 5e of the chassis 5 so as to use its biasing force created when setting the magazine 50 for ejecting same, whereas the extension coil spring 14 is arranged between the base 7c of the ejector lever 7 and the tongue 13b of the limiter 13 so as to directly rotate the limiter 13 by the second cam portion 29 of the cam gear 27 which is driven by the motor 21, assisting the magazine ejecting operation of the ejector lever 7. Additionally, the click 6a of the lock lever 6 is retracted by the first cam portion 28 of the cam gear 27 to release the lock on the magazine 50. Thus, the lock lever 6 and the limiter 13 can directly be operated by the first and second cam portions 28, 29 of the cam gear 27, largely decreasing the number of component parts of the lock releasing mechanism 20, resulting in a simple arrangement of the system. Additionally, when ejecting the magazine 50, the engagement portion 7a of the ejector lever 7 presses the back 50c of the magazine 50 substantially in its center portion, thereby maximining the magazine ejecting force, resulting in smooth and sure ejection of the magazine 50 when loaded with 10 CDs 51.

Figure 8:
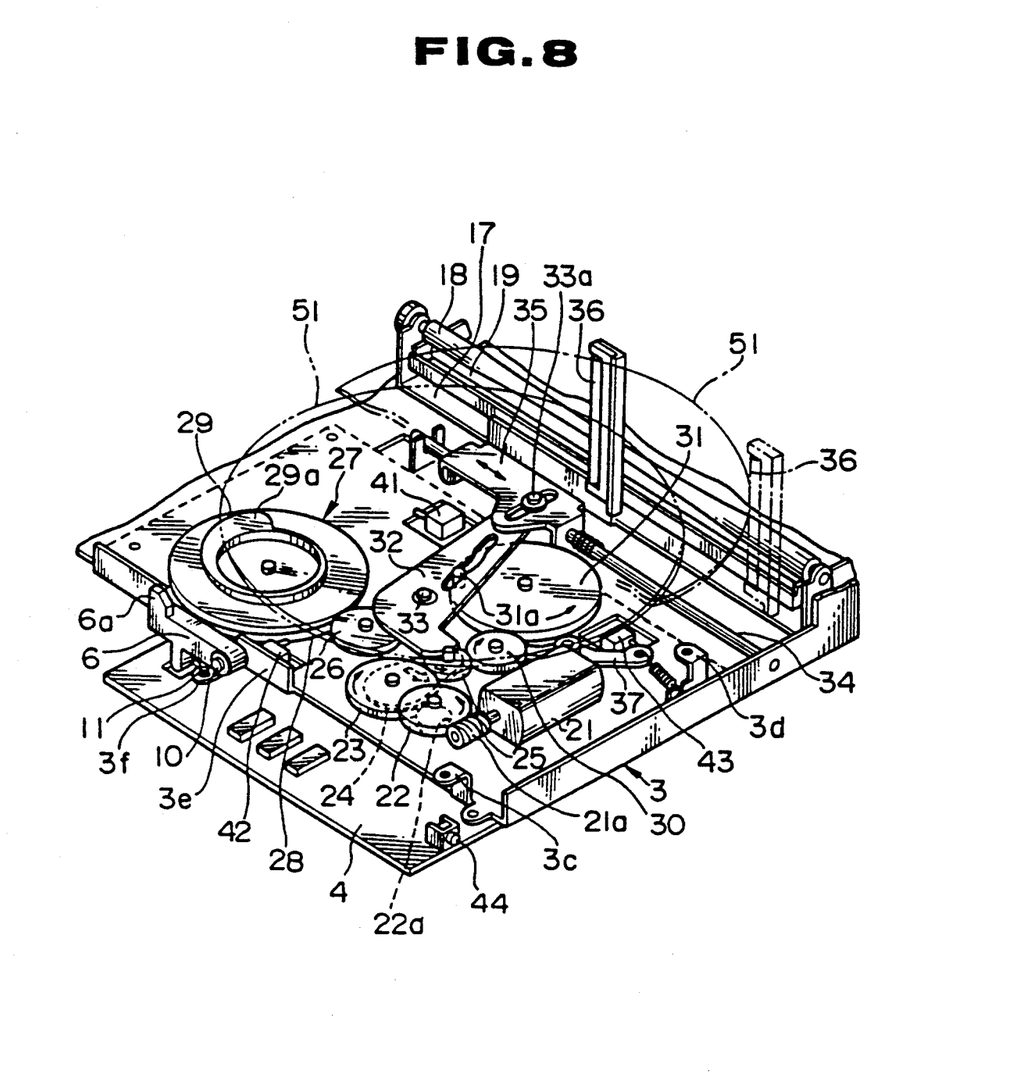
FIG. 8 is a perspective view, showing a main part of the disk magazine remover system.

Referring to FIG. 8, after being selectively withdrawn from the magazine 50 set in the CD player 2 and replayed through an optical pickup (not shown) of the CD player 2, the CD 51 is received again in the magazine 50 by the pair of guide rollers 18, 19 of the CD player 2. When the CD 51 is not fully received in the magazine 50 and has its peripheral portion protruding from the opening 50g of the magazine 50, the motor 21 is rotated in a reverse direction. This rotates the intermediate gear 22 in a direction as indicated by an arrow as viewed in FIG. 8 or counterclockwise. The drive gear 23 as engaged with the lower small gear portion 22a of the intermediate gear 22 is then rotated counterclockwise, swinging the swing plate 24 clockwise, thus engaging the swing gear 25 with the intermediate gear 30. The cam gear 31 as engaged with the intermediate gear 30 is rotated counterclockwise, rotating the lever 32 on the supporting shaft 33 through the cam portion 31a of the cam gear 31. The slider 35 is reciprocated along the guide bar 34 to reciprocate the guide pole 36 along the pair of the guide rollers 18, 19, pressing the peripheral portion of the CD 51 which protrudes from the opening 50g of the magazine 50, thus fully receiving the CD 51 in the magazine 50.

In this embodiment, the extension coil spring 14 serves as the second elastic member. Alternatively, another type of elastic member such as a torsion coil spring and the like may be used.

What is claimed is:

1. A disk magazine remover system adapted to receive a magazine, the magazine having a recess on a bottom thereof, comprising:

a chassis on which the magazine is slidably set;

a lock lever arranged for locking the magazine onto said chassis, said lock lever having a protrusion which is engaged with the recess of the magazine when the magazine is locked onto said chassis;

an ejector lever rotatably supported to said chassis, said ejector lever including an engagement portion which protrudes from said chassis to press the magazine off of said chassis;

a first elastic member arranged between said chassis and said ejector lever for biasing said ejector lever in a direction for ejecting the magazine from said chassis;

a limiter rotatably supported to said chassis, said ejector lever and said limiter having a common axis of rotation, and said limiter including a lug element in contact with an edge portion of said ejector lever, so that movement of said ejector lever in a direction opposite to said ejecting direction causes movement of said limiter;

a second elastic member arranged between said ejector lever and said limiter for biasing said ejector lever in said ejecting direction to eject the magazine from said chassis; and a lock releasing mechanism arranged on said chassis for releasing said lock lever from the magazine.

2. A disk magazine remover system as claimed in claim 1, wherein said first elastic member includes a torsion coil spring.

3. A disk magazine remover system as claimed in claim 1, wherein said second elastic member includes an extension coil spring.

4. A disk magazine remover system as claimed in claim 1, wherein said lock releasing mechanism includes a motor and a cam gear rotated thereby, said cam gear being formed with a first cam portion for moving said protrusion of said lock lever toward and away from said chassis for engagement and disengagement respectively with the recess of the magazine and a second cam portion for rotating said limiter in said ejecting direction to eject the magazine from said chassis.

5. A disk magazine remover system as claimed in claim 4, wherein said lock releasing mechanism further includes an intermediate gear between said motor and said cam gear, said intermediate gear driving said cam gear when said motor rotates.

6. A disk magazine remover system as claimed in claim 5, wherein said intermediate gear includes a swing gear for selectively engaging said intermediate gear with said cam gear.

7. A disk magazine remover system as claimed in claim 4, wherein said first cam portion is disposed on one side of said cam gear, and said second cam portion is disposed on another side of said cam gear opposite said one side.

* * * * *